United States Patent
Zaher et al.

(10) Patent No.: US 7,703,392 B2
(45) Date of Patent: Apr. 27, 2010

(54) PRESSURE BASED METHOD AND APPARATUS FOR APPLYING A DECORATION ONTO AN OBJECT

(75) Inventors: Maximilian Zaher, Edewecht (DE); Kai Janssen, Edewecht (DE)

(73) Assignee: DeMaxZ AG, Zug (CH)

( * ) Notice: Subject to any disclaimer, the term of this patent is extended or adjusted under 35 U.S.C. 154(b) by 0 days.

(21) Appl. No.: 11/718,991

(22) PCT Filed: Nov. 22, 2005

(86) PCT No.: PCT/US2005/042379

§ 371 (c)(1),
(2), (4) Date: May 10, 2007

(87) PCT Pub. No.: WO2006/058032

PCT Pub. Date: Jun. 1, 2006

(65) Prior Publication Data

US 2008/0216692 A1    Sep. 11, 2008

(51) Int. Cl.
B29C 51/16    (2006.01)
B29C 63/02    (2006.01)
B41M 3/12    (2006.01)

(52) U.S. Cl. .................. 101/34; 156/230; 156/240; 101/33; 101/492

(58) Field of Classification Search ............ 101/34, 101/35, 33, 492; 156/230, 234
See application file for complete search history.

(56) References Cited

U.S. PATENT DOCUMENTS 3,418,926 A   12/1968   Hakogi
4,314,814 A    2/1982   Deroode

FOREIGN PATENT DOCUMENTS

| EP | 0318230 A2 | 5/1989 |
|---|---|---|
| EP | 0922588 A2 | 6/1999 |
| EP | 0993874 A1 | 4/2000 |
| EP | 0993876 A1 | 4/2000 |
| EP | 0993968 A1 | 4/2000 |
| EP | 1000731 A1 | 5/2000 |
| JP | 03000284 A | 1/1991 |
| JP | 05293895 A * | 11/1993 |
| JP | 05293896 A * | 11/1993 |
| KR | 9002151 B | 4/1990 |
| WO | 94/05483 A1 | 10/2006 |

* cited by examiner

Primary Examiner—Leslie J Evanisko
(74) Attorney, Agent, or Firm—Robert R. Deleault, Esq.; Mesmer & Deleault, PLLC

(57) ABSTRACT

A method and an apparatus for applying a decoration onto an object (50) use a chamber (22) that can be divided by a deformable foil (10) into a first space (24) and a second space (26). Said foil (10) comprises a carrier film (20), a decoration layer (16), and, at least, a varnish layer (18). The first and second spaces (24, 26) are evacuated simultaneously and, thereafter, a pressure gradient is generated to press the foil (10) against the object (50) to be decorated and to transfer at least the decoration layer (16) and the varnish layer (18) onto the object (50).

16 Claims, 1 Drawing Sheet

PRESSURE BASED METHOD AND APPARATUS FOR APPLYING A DECORATION ONTO AN OBJECT

CROSS-REFERENCE TO RELATED APPLICATION

None.

STATEMENT REGARDING FEDERALLY SPONSORED RESEARCH OR DEVELOPMENT

None.

BACKGROUND OF THE INVENTION

A. Field of the Invention

The present invention is concerned with a method and an apparatus for applying a decoration onto an object.

The said object to be decorated may, for example, be made from a plastics material, a derived timber product, or a metal. Such objects very often need to be decorated, where the term "decoration" includes, in particular, the application of a colour layer. Such a colour decoration may be a homogeneous single colour decoration and/or a decoration comprising a picture or an ornamental pattern. In a variety of instances, e.g. in automotive industries, furniture industries, electrical appliance manufacture etc., there can be a need to apply a decoration onto an object. In the following, the present invention is described and explained in connection with decorating a housing of a mobile telephone, such housings typically being made from a plastics material.

B. Description of Related Art

It is known in the prior art to decorate objects by means of a foil that carries a sublimable dye and floats on a liquid. As used herein, the term "foil" does not necessarily imply a thin layer of metal material, but may be used to refer to a thin layer of any material, particularly plastics. The object to be decorated is pressed against the foil for decoration transfer (see, for example, EP 0 922 588 A2 and EP 0 993 874 A1 and EP 1 000 731 A1). It is also known in the prior art to use carrier films comprising so-called "release"-properties in order to transfer a decoration layer onto an object. A varnish protecting the decoration layer can be hardened by radiation or an electron beam (see, for example, EP 0 993 968 A1). The prior art also teaches the use of pressurized air flow in order to enhance the contact between a carrier film comprising a colour layer and an object to be decorated (see EP 0 993 876 A1).

BRIEF SUMMARY OF THE INVENTION

The present invention aims at providing a method and an apparatus for decorating an object allowing a very high quality of decoration by relatively simple means. In particular, the present invention aims at decorating 3-dimensional objects in high contour accuracy without any air inclusions between the decoration layer and the object and, furthermore, with a high degree of pattern accuracy, i.e. the object is decorated with a decoration pattern that corresponds to the wanted decoration pattern and that is completely and continuously applied to the surface of the object, in particular in areas where the object comprises indentations, holes or protrusions.

The method of applying a decoration onto an object, in accordance with the present invention, comprises at least the steps of providing a deformable laminated foil comprising at least a carrier layer, a colour decoration layer, and a protective varnish layer, positioning said foil and said object in a space that can be evacuated, wherein said object is positioned at one side of said foil, evacuating said space simultaneously at said one side of said foil and at the opposite side of said foil such that said foil remains essentially stationary, applying a pressure gradient across said foil such that the foil is pressed against said object without gap wherever the object is to be decorated to transfer at least said decoration layer and said varnish layer onto the object, and releasing said carrier layer from the decorated object.

When evacuating simultaneously the space at both sides of the deformable laminated foil, the foil is not applied immediately onto the object to be decorated. Rather, the foil is maintained without contact to the object for a time sufficient to completely evacuate the space between the foil and the object. Only thereafter is the foil brought into contact with the object by applying a certain pressure (which pressure may be smaller than atmospheric pressure) onto the side of the foil that is opposite from the object. If the foil is made sufficiently deformable without the risk of disruption or fissures, the pressure will cause the foil to cover the object to be decorated completely, continuously and with high form accuracy, even if that object has a relatively complicated 3-dimensional shape, such as for example, a housing of a mobile phone which typically comprises indentations, pits, recesses and other structures that are angled or even perpendicular to the main surface of the object. The said laminated foil, according to the present invention, preferably comprises a carrier layer that is made of a plastics material capable of deforming without tearing, in particular when heated to temperatures at which the material becomes plastically deformable. Such materials include, for example, polyolefins, like polyethylene or polypropylene, polyvinylalcohol (PVA), polyvinylchloride (PVC) or polyester.

The temperatures to which such materials are to be heated to obtain the afore-mentioned deformability without tearing differ from material to material. For example, a PVC foil at temperatures of about 80° C. becomes plastically deformable in a wide range to be continuously applied to the surface of a complicated 3-dimensional structure without breaking. The typical thickness of such a carrier foil carrying the colour decoration, varnish and other layers, is between 30 µm and some hundred µm, depending on the shape of the object to be decorated and the amount of deformation needed.

A carrier foil made from polyester generally needs to be heated up to much higher temperatures, typically around 240° C., to become deformable as required such that it can be applied continuously onto an object of complicated 3-dimensional shape.

The optimum temperature to which the foil must be heated depends, in particular, on the material of the foil, the structure and material of the object to be decorated, the temperature of the object to be decorated, and the structure of the decoration to be applied onto the object. Therefore, the optimum process parameters, in particular the pressure difference and the temperatures of the foil and the object to be decorated must be determined in each case experimentally. Advantageously, not only the foil is heated to the afore-mentioned temperature but also the object to be decorated.

The foil comprises typically a carrier layer made of one of the above-mentioned plastics materials, a varnish layer on the carrier layer, a colour layer on that varnish layer (wherein the colour layer represents the colour decoration to be applied onto the object), a primer, if necessary, and an adhesion enhancing layer, if necessary.

The invention also teaches an apparatus for applying a decoration onto an object, said apparatus comprising
- a chamber that can be divided by a deformable foil into a first and a second space, said first space and said second space each being gas tight,
- a support for positioning said object in said second space,
- a pump for evacuating said first and second spaces,
- a valve for generating a pressure difference between said first space and said second space such that said foil is deformed and pressed against the object without gap wherever the object is to be decorated, wherein
- said deformable laminated foil comprises at least a carrier layer, a colour decoration layer, and a protective varnish layer.

In connection with such an apparatus the afore-mentioned methods can be applied.

One essential advantage of the method and apparatus according to the present invention is that a full decoration of an object can be obtained, including a colour layer and a protective varnish layer, and optionally further layers, in one single step by using a foil comprising such layers. The layers, in particular the decoration layer and the varnish layer, are transferred from the carrier layer of the foil onto the object. There is no need for a separate varnishing step or any other chemical process. In particular, the method and apparatus of the present invention are highly advantageous under both environmental and economic considerations. For example, the elimination of a separate varnishing step means there will be no waste varnish to dispose of when the process is complete. Likewise, the elimination of the varnishing step results in a more economic use of varnish compounds.

In the following, a preferred embodiment of the present invention is described with reference to the drawings.

DETAILED DESCRIPTION OF THE INVENTION

Figure 1:
FIG. 1 shows a cross section through a deformable laminated foil.

The foil shown in schematic cross section in FIG. 1 is used to transfer layers of colour decoration, varnish and, optionally, further layers from a carrier film onto an object to be decorated.

In the embodiment shown in FIG. 1, the foil 10 comprises a layer 12 of an adhesive. As one nonlimiting example, the adhesive could be a water-based acrylic resin. That layer 12 of an adhesive is positioned, after transfer onto the object, lowermost in direct contact with the object, as described further below. Optionally, if needed, a primer layer 14 is above the adhesive layer 12. The primer may provide a basic colour of the decoration. In particular, when the object to be decorated is transparent, a primer may be used to provide a base colour onto which a more structured colour decoration is applied. As one nonlimiting example, the primer could be a water-based acrylic or olefin primer.

Above the primer layer 14, there is a colour decoration layer 16 comprising the colour decoration for decorating the object and a varnish layer 18. For example, the colour decoration layer 16 may comprise a picture in different colours or another pattern composed of one colour or different colours. As nonlimiting examples, the varnish could be a water-based acrylic or olefin resin while the colour layer could comprise one or more thermo-formable inks.

All the afore-mentioned layers 12, 14, 16 and 18 are carried on a carrier film 20 made of a thermoplastic material, like a polyolefin, e.g. polyethylene or polypropylene, or a polyester, PVA or PVC. The thickness of the carrier film 20 depends on its material, the shape of the object to be decorated and the type of decoration. Typically, the thickness of the carrier film 20 is in the range of 20 µm to several hundred (e.g. approximately 100 to 500) µm. The binding between the varnish layer 18 and the carrier film 20 should be weak enough to allow that, after application of the entire foil 10 onto an object, the carrier film 20 can be released from the other layers 12, 14, 16 and 18 such that the adhesive layer 12, the primer 14, the decoration layer 16 and the varnish layer 18 stick homogeneously on the surface of the object to be decorated, whereas the carrier film 20 can be removed. The removal of the carrier film 20 should be possible without disturbing any other layer, at least after being heated. To obtain a smooth removal of the carrier layer 20 from the other layers, the so-called surface energy of the contact between the varnish layer 18 and the carrier foil 20 is in the range of 30 to 40 dyne or smaller. The material of the carrier foil 20 is thermoplastic, i.e. it becomes plastically deformable at a certain temperature, depending on the material.

The thickness of the layers 12, 14, 16 and 18 combined, corresponds essentially to the thickness of the carrier film 20.

Figure 2:
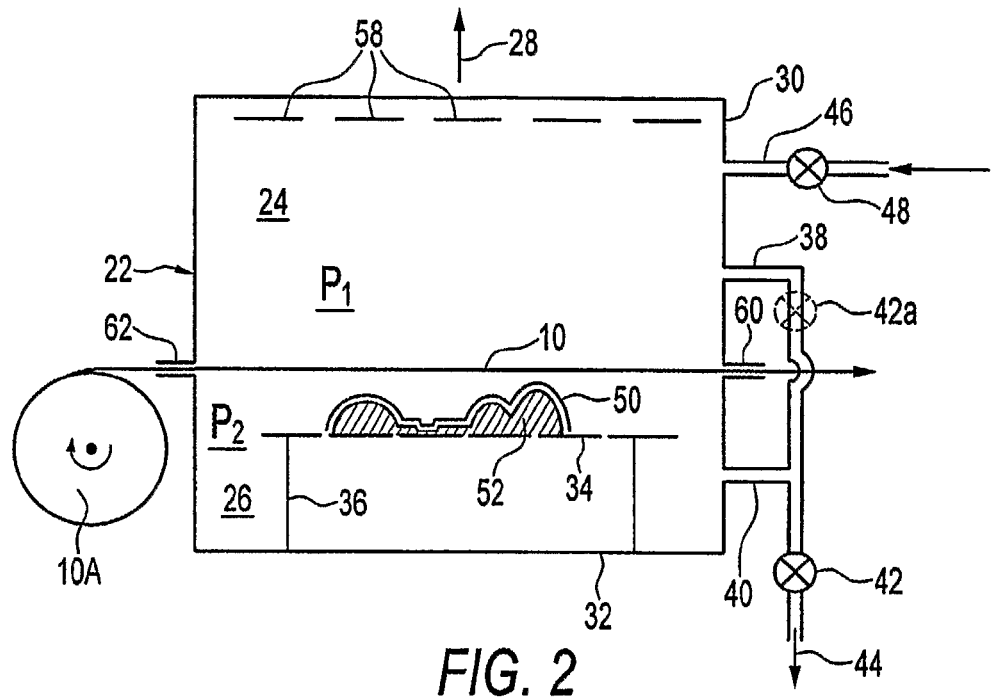
FIG. 2 shows a schematic cross-section of an apparatus for applying a decoration onto an object.
Figure 3:
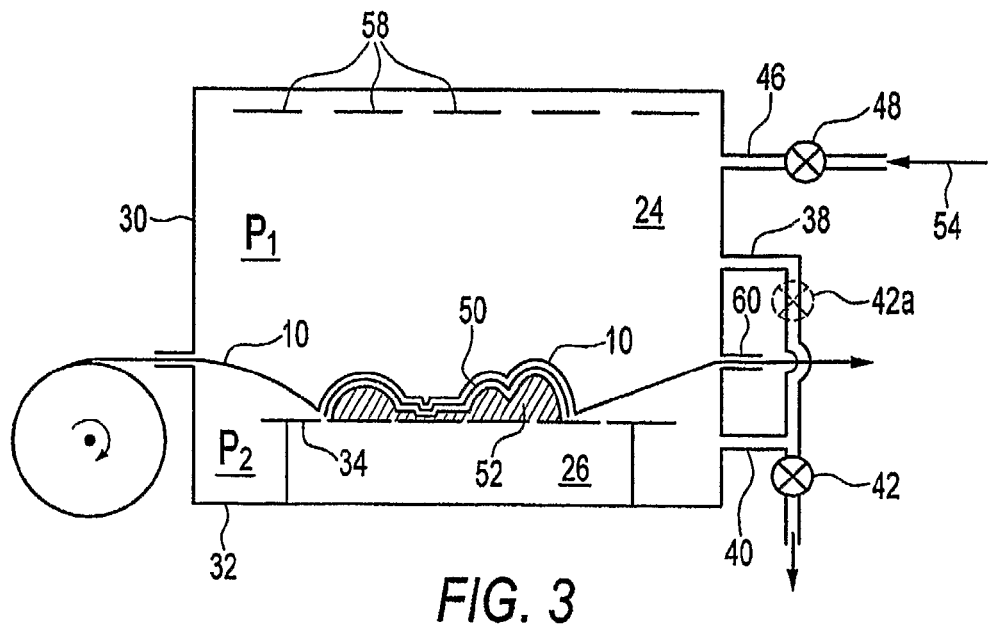
FIG. 3 shows a cross-section of the apparatus according to FIG. 2, where the deformable foil is in contact with the object to be decorated.

FIGS. 2 and 3 show how a foil 10 according to FIG. 1 is used to decorate an object like, for example, a housing of a mobile phone.

The apparatus shown in FIGS. 2 and 3 comprises a chamber 22. The inside of the chamber 22 can be divided by the foil 10 into a first gas tight space 24 and a second gas tight space 26. The chamber 22 is composed of a first hood 30 and a second hood 32. The first hood 30 can be moved in the direction of arrow 28 whereas the second hood 32 is stationary. After lifting the first hood 30, the interior of the second hood 32 is exposed and an object 50 to be decorated can be positioned on a perforated plate 34 that is supported by legs 36. The object 50 to be decorated is a hollow housing of a mobile phone and it is supported on the plate 34 by a support 52. Support 52 has a shape corresponding essentially to the interior shape of the object 50. The support 52 is, for example, made of wood.

After positioning the object 50 in the second hood 32 and still maintaining the first hood 30 in the lifted position (indicated by arrow 28) the foil 10 can be passed across the chamber 22 as is indicated by the arrow at the end of the foil 10. The foil 10 is wound off from a roll 10A.

After lowering the first hood 30 (reverse to direction of arrow 28), the foil 10 is squeezed in-between the first and second hoods 30, 32 thereby defining the first and second gas tight spaces 24, 26.

A conduit 38 connects the first space 24 to a vacuum pump (not shown) indicated by arrow 44. A second conduit 40 connects the second space 26 to the vacuum pump. A valve 42 is arranged between said conduits 38, 40 and the vacuum pump. An alternative embodiment of the apparatus may use a valve 42a (shown with dashed lines) which is described in more detail below.

The first space 24 is connected to another conduit 46 in which a valve 48 is arranged.

Heating elements 58 are arranged such that they can heat, in particular, the foil 10 arranged in chamber 22. For example, the heating elements 58 may emit infrared radiation for heating up the foil 10. Furthermore, the heating elements 58 may be selected such that, in addition to the foil 10, the emitted radiation also heats the object 50 underneath the foil 10.

The operation of the apparatus according to FIGS. 2 and 3 for decorating an object 50 is as follows:

In the state shown in FIG. 2, valves 42 and 48 are closed and the pressure $p_1$ in the first space 24 and the pressure $p_2$ in the second space 26 are equal. For example, the pressures $p_1$ and $p_2$ may correspond to the atmospheric pressure obtained after feeding the foil 10 through the chamber 22 and closing the first and second hoods 30, 32 with contact at side flanges 60, 62. It will be understood that flanges 60, 62 extend around the perimeters of hoods 30, 32 and that foil 10 is sufficiently wide to overlap flanges 60, 62 such that flanges 60, 62 squeeze the foil 10 in order to obtain a gas tight closure.

Because the pressures $p_1$ and $p_2$ in the first and second spaces 24, 26 are equal in this state, there is essentially no force acting upon foil 10 in the chamber 22 except gravity, which is negligible. The arrangement shown in FIGS. 2 and 3 can also be such that the apparatus is rotated by 90° so that the foil 10 extends in the vertical direction. However, the particular arrangement as shown in FIGS. 2 and 3 allows for an easy handling of the object 50 to be decorated as well as its support 52.

After the pressures $p_1$ and $p_2$ in the first and second spaces 24 and 26, respectively, are set equal, the valve 42 is opened so that conduits 38 and 40 are simultaneously connected to a vacuum pump (not shown but indicated by air flow 44) and the first and the second spaces 24, 26 are evacuated simultaneously. For example, after evacuation, equal pressures in a range of $10^{-5}$ bar to $10^{-7}$ bar (N/cm$^2$) are obtained in the first and second spaces 24, 26 with a simple standard vacuum pump. After evacuation of both the first and second spaces 24, 26 separated by the foil 10, the foil 10 is still stationary because the forces acting at both sides of the foil are equal (gravity being neglected).

After evacuation, the heating elements 58 are operated to heat up the foil 10 and the object 50 to be decorated. The foil 10 is heated up to a temperature at which it is still stable but sufficiently deformable to allow what is described in connection with FIG. 3. For example, about 80° C. in the case of a PVC foil or about 240° C. in the case of a polyester foil.

In one embodiment in which valve 42a is not used, the valve 42 remains open. Valve 48 is then opened so that a gas 54, e.g. from the surrounding atmosphere, is gradually introduced into the first space 24. However, the pump at 44 continues to evacuate any gas entering conduit 38, and thus, the second space 26 remains evacuated. Therefore, as suggested in FIG. 3, the pressure pi in the first space 24 becomes larger than the pressure $p_2$ in the second space 26 and, accordingly, a force acts upon the foil 10 bending the foil towards the object 50 to be decorated.

The present invention also includes an alternative embodiment which uses valve 42a. In this embodiment, valve 42 and 42a are open when evacuating spaces 24 and 26. However, valve 42 and 42a are closed prior to opening valve 48 and introducing gas into first space 24. Thus, the closed valve 42a prevents gas from entering space 26 and it is not necessary to continuously operate the pump at 44.

Because the heated foil 10 is plastically deformable without ruptures, and because the second space 26 is evacuated, the foil 10 is pressed homogeneously without any air bubbles between the object 50 and the foil 10 against the object 50 to be decorated, as is schematically shown in FIG. 3. The foil 10 accurately takes the shape of the object 50, in particular, in areas that are angled with regard to the original plane of the foil 10 shown in FIG. 2, or even areas that are perpendicular to that plane. After the foil 10 makes contact with the object 50 to be decorated, the adhesive layer 12, primer 14, decoration layer 16 and varnish layer 18 stick homogeneously to the object 50, whereas the carrier layer 20 can be peeled off and is removed easily if the pressures $p_1$ and $p_2$ are made equal again.

In some instances, it may be desirable to assist the peeling off of carrier layer 20 from object 50 by placing a small amount of tension on carrier layer 20 after it has been pressed against object 50. Although not explicitly shown, it will be understood that carrier layer 20 exiting chamber 22 is collected on a second roll. Rotation of this second roll may be used to place tension on carrier layer 10. For some carrier films (e.g. PVC), it may be necessary to slightly lift hood 30 in order to place tension on carrier film 10. However, other carrier films (e.g. polyester) may be sufficiently strong that tension may be applied without lifting hood 30.

Object 50 is thereby completely and accurately decorated including a protective varnish layer without the need for a separate varnishing step.

What is claimed is:

1. A method of applying a decoration onto an object, said method comprising the steps of:
   a) providing a deformable laminated foil comprising at least a carrier film, a colour decoration layer, and a protective varnish layer and providing a hollow object with a three dimensional shape including an exterior surface and an interior surface;
   b) positioning said foil and said object in a space that can be evacuated, wherein said object is positioned at one side of said foil wherein said object is positioned on a perforated plate by a support having a shape with an upper surface corresponding essentially to the interior surface of said object;
   c) evacuating said space simultaneously at said one side of said foil and at the other side of said foil such that said foil is essentially stationary;
   d) applying a pressure gradient across said foil such that said foil is pressed against said exterior surface of said object without gap wherever said object is to be decorated to transfer at least said decoration layer and said varnish layer onto said object; and
   e) releasing said carrier film from the so decorated object.

2. A method according to claim 1, comprising the further step of heating said foil before step d).

3. A method according to claim 2, comprising the further step of heating said object before step d).

4. A method according to claim 2, wherein said foil is heated to a temperature at which the carrier film becomes plastically deformable.

5. A method according to claim 1, wherein said deformable laminated foil comprises an adhesion enhancing layer.

6. A method according to claim 1, wherein said deformable laminated foil comprises a primer layer.

7. A method according to claim 1, wherein said carrier film is made from a polyolefin, polyvinylalcohol, polyvinylchloride or a polyester.

8. A method according to claim 1, wherein said carrier film has a thickness in the range from 20 to 400 µm.

9. A method according to claim 8, wherein said carrier film has a thickness in the range from 30 to 100 µm.

10. A method according to claim 1, wherein said support is made of wood.

11. An apparatus for applying a decoration onto an object, said object being hollow and having a three-dimensional shape including an exterior surface and an interior surface said apparatus comprising:
- a chamber that can be divided by a deformable foil into a first space and a second space, said first space and said second space each being gas tight;
- a perforated plate for positioning said object in said second space;
- a support for supporting said object on said perforated plate wherein said support has a shape with an upper surface corresponding essentially to the interior surface of said object:
- a pump for evacuating said first and second spaces; and
- a valve for generating a pressure difference between said first space and said second space such that said foil is deformed and pressed against said object without gap wherever said object is to be decorated, wherein said deformable laminated foil comprises at least a carrier film, a colour decoration layer, and a protective varnish layer.

12. Apparatus according to claim 11, wherein said pump is connected to said first space and said second space such that said spaces can be evacuated simultaneously and said foil is essentially stationary.

13. Apparatus according to claim 11, comprising heating elements for heating said foil.

14. Apparatus according to claim 13, wherein said heating elements are controllable to heat said foil such that said foil becomes plastically deformable.

15. An apparatus according to claim 11, wherein said support is made of wood.

16. A method of applying a decoration onto an object, said method comprising the steps of:
a) providing a deformable laminated foil comprising at least a carrier film, a colour decoration layer, and a protective varnish layer and providing a hollow object with a three dimensional shape including an exterior surface and an interior surface;
b) positioning said foil and said object in a space that can be evacuated, wherein said object is positioned at one side of said foil wherein said object is positioned on a perforated plate by a support having a shape with an upper surface corresponding essentially to the interior surface of said object;
c) reducing pressure in said space containing said object;
d) applying a pressure gradient across said foil such that said foil is pressed against said exterior surface of said object without gap wherever said object is to be decorated to transfer at least said decoration layer and said varnish layer onto said object; and
e) releasing said carrier film from the so decorated object.

* * * * *